(12) United States Patent
Patel

(10) Patent No.: US 10,780,631 B2
(45) Date of Patent: Sep. 22, 2020

(54) COMPOSITIONS AND METHODS FOR ADDITIVE MANUFACTURING

(71) Applicant: Imerys Filtration Minerals, Inc., San Jose, CA (US)

(72) Inventor: Navin Patel, Lompoc, CA (US)

(73) Assignee: IMERYS USA, INC., Roswell, GA (US)

( * ) Notice: Subject to any disclaimer, the term of this patent is extended or adjusted under 35 U.S.C. 154(b) by 212 days.

(21) Appl. No.: 15/735,612

(22) PCT Filed: Nov. 2, 2016

(86) PCT No.: PCT/US2016/060097
§ 371 (c)(1),
(2) Date: Dec. 12, 2017

(87) PCT Pub. No.: WO2017/079282
PCT Pub. Date: May 11, 2017

(65) Prior Publication Data
US 2018/0304528 A1 Oct. 25, 2018

Related U.S. Application Data

(60) Provisional application No. 62/250,855, filed on Nov. 4, 2015.

(51) Int. Cl.
| | | |
|---|---|---|
| *B29C 64/165* | (2017.01) | |
| *C04B 28/14* | (2006.01) | |
| *B33Y 70/10* | (2020.01) | |
| *C04B 20/00* | (2006.01) | |
| *B33Y 10/00* | (2015.01) | |
| *C04B 111/00* | (2006.01) | |
| *B29K 105/12* | (2006.01) | |
| *B29K 509/00* | (2006.01) | |
| *B29K 1/00* | (2006.01) | |
| *B29K 105/00* | (2006.01) | |

(52) U.S. Cl.
CPC ............ *B29C 64/165* (2017.08); *B33Y 70/10* (2020.01); *C04B 20/008* (2013.01); *C04B 28/14* (2013.01); *B29K 2001/08* (2013.01); *B29K 2105/122* (2013.01); *B29K 2105/251* (2013.01); *B29K 2509/00* (2013.01); *B33Y 10/00* (2014.12); *C04B 2111/00043* (2013.01); *C04B 2111/00181* (2013.01); *Y10T 428/24802* (2015.01)

(58) Field of Classification Search
CPC ....... B29C 64/165; B33Y 10/00; B33Y 70/00; B29K 2909/00; Y10T 428/24802
See application file for complete search history.

(56) References Cited

U.S. PATENT DOCUMENTS

| | | |
|---|---|---|
| 2004/0038009 A1 | 2/2004 | Leyden et al. |
| 2014/0221566 A1 | 8/2014 | Martinoni |

FOREIGN PATENT DOCUMENTS

| | | |
|---|---|---|
| WO | WO 2015/036802 A2 | 3/2015 |

OTHER PUBLICATIONS

International Search Report and Written Opinion dated Mar. 8, 2017, in International Application No. PCT/US2016/060097 (14 pgs.).

*Primary Examiner* — Gerard Higgins
(74) *Attorney, Agent, or Firm* — Finnegan, Henderson, Farabow, Garrett & Dunner

(57) ABSTRACT

A composition for additive manufacturing of an article may include a base material, a functional particulate having at least one of an acicular morphology and a platy morphology, and binder. The functional particulate may increase a strength property of the article manufactured with the composition as compared to the strength property of the article manufactured with the composition being devoid of the functional particulate. A method of manufacturing an article via additive manufacturing may include providing a first layer of a powder composition. The powder composition may include a base material, a functional particulate, and binder. The method may also include binding the first layer of powder composition in a predetermined pattern to form a hardened two-dimensional shape including the powder composition, and successively providing additional layers of the powder composition and binding the respective layers to form the article.

18 Claims, No Drawings

COMPOSITIONS AND METHODS FOR ADDITIVE MANUFACTURING

CLAIM FOR PRIORITY

This application is a U.S. national phase entry of International Application No. PCT/US2016/060097, filed Nov. 2, 2016, which claims the benefit of priority of U.S. Provisional Patent Application No. 62/250,855, filed Nov. 4, 2015, to both of which this application claims the benefit of priority, and the entirety of the subject matter of both of which is incorporated herein by reference.

FIELD OF THE DISCLOSURE

The present disclosure relates to compositions and methods related to additive manufacturing, and more particularly, to compositions and methods related to additive manufacturing that include functional particulates.

BACKGROUND

Solid objects having complex shapes may be manufactured by additive manufacturing methods that are also sometimes referred to as "three-dimensional printing." Three-dimensional printing may generally refer to a process by which three-dimensional objects are manufactured via an additive process, where successive layers of material are laid down in different shapes to form a three-dimensional article of manufacture. For example, a digital or virtual blueprint of the article obtained from computer-aided design software may be sliced into two-dimensional digital cross-sections of the article, and the three-dimensional printer successively lays down the material according to the digital cross-sections to form the article. Once completed, the three-dimensional article may be said to have been "printed."

An example of a three-dimensional printing technique is sometimes referred to as "powder bed" fabrication, "binder jetting," and "drop-on-powder." In some powder bed fabrication manufacturing techniques, a bed of powder is provided, and predetermined two-dimensional shapes are formed in the powder by binding the powder, for example, by adding a liquid to the powder in the predetermined shape or by heating the powder according to the predetermined shape. After binding a layer of the powder in the predetermined shape, an additional layer of the powder is provided over the bound layer, and the process is repeated until the three-dimensional article is completed. After which, the excess or unbound powder may be removed from the article in a process sometimes referred to as "de-powdering," thereby resulting in the three-dimensional article. Additional finishing processes may be subsequently performed, such as painting, or treating with adhesives or crosslinking resins to improve the strength of the article.

This process may suffer from several potential drawbacks. First, the articles created in this manner often lack a desired level of strength, depending on the article and its desired use. In addition, although some post-formation processes may increase the strength of the article, such processes may add expense or provide insufficient strength to the article.

Therefore, it may be desirable to provide compositions and methods for additive manufacturing that mitigate or overcome one or more of the possible drawbacks described above, as well as other possible drawbacks.

SUMMARY

According to one aspect, a composition for additive manufacturing of an article may include a base material, a functional particulate having at least one of an acicular morphology and a platy morphology, and binder. The functional particulate may increase a strength property of the article manufactured with the composition as compared to the strength property of the article manufactured with the composition being devoid of the functional particulate.

According to another aspect, a powder composition for additive manufacturing of an article may include a base material, a functional particulate having at least one of an acicular morphology and a platy morphology, and binder. The powder composition within the article manufactured including the functional particulate may have improved particle packing as compared to the article manufactured with the powder composition being devoid of the functional particulate.

According to a further aspect, a method of manufacturing an article via additive manufacturing may include providing a first layer of a powder composition. The powder composition may include a base material, a functional particulate having at least one of an acicular morphology and a platy morphology, and binder. The functional particulate may have an aspect ratio of at least 3:1. The method may also include binding the first layer of powder composition in a predetermined pattern to form a two-dimensional shape including the powder composition. The method may further include successively providing additional layers of the powder composition and binding the respective layers to form the article via layers of the two dimensional shapes including the powder composition.

According to still another aspect, a method of strengthening an additive manufactured article may include providing a powder composition including a base material and binder with a functional particulate having at least one of an acicular morphology and a platy morphology. The method may also include binding the powder composition in a predetermined pattern to form a two-dimensional shape comprising the powder composition. The powder composition within the article manufactured including the functional particulate may have improved particle packing as compared to the article manufactured with the powder composition being devoid of the functional particulate.

DESCRIPTION OF EXEMPLARY EMBODIMENTS

According to some embodiments, a composition for additive manufacturing of an article may include a base material, a functional particulate having at least one of an acicular morphology and a platy morphology, and binder. The functional particulate may increase a strength property of the article manufactured with the composition as compared to the strength property of the article manufactured with the composition being devoid of the functional particulate.

As used herein, "additive manufacturing" refers to use of a machine, such as a three-dimensional printer, to form an article from the materials of formation, such as, for example, the compositions disclosed herein. According to some embodiments, additive manufacturing does not include the use of a syringe or similar hand-held device to manually supply material to voids in an article manufactured according to additive manufacturing processes.

As used herein, "acicular morphology" refers to particulates including, or derived from, slender, needle-like structures or crystals, or particulates having a similar form. As used herein, "platy morphology" refers to particulates having an aspect ratio greater than 1. In contrast, particulates having an aspect ratio less than or equal to 1 would be considered to have a "blocky morphology."

The morphology of the functional particulate, according to some embodiments, may be characterized by aspect ratio. The aspect ratio of a particulate refers generally to a ratio of the length-to-width of the particulate. For a given particulate sample, the aspect ratio may be determined as an average. For example, the aspect ratio of the functional particulate according to some embodiments may be determined by first depositing a slurry including a sample of the functional particulate on a standard SEM stage and coating the slurry with platinum. Images of the slurry may thereafter be obtained, and the particle dimensions may be determined, for example, using a computer-based analysis, in which it is assumed that the thickness and width of the particles are equal. The aspect ratio may then be determined by averaging a number of calculations (e.g., fifty calculations) of individual particle length-to-width aspect ratios. Other methods of determining aspect ratios are contemplated.

According to some embodiments, the functional particulate may have an aspect ratio of at least 3:1. For example, the functional particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

Particle sizes and other particle size properties referred to in the present disclosure may be measured using a Sedigraph 5100 instrument, as supplied by Micromeritics Corporation. Using such a measuring device, the size of a given particle is expressed in terms of the diameter of a sphere of equivalent diameter, which sediments through the suspension, sometimes referred to as "an equivalent spherical diameter" or "esd." The median particle size, or the "$d_{50}$" value, is the value determined by the particle esd at which 50% by weight of the particles have an esd less than the $d_{50}$ value. Similarly, the "$d_{30}$" value, is the value determined by the particle esd at which 30% by weight of the particles have an esd less than the $d_{30}$ value, and the "$d_{70}$" value, is the value determined by the particle esd at which 70% by weight of the particles have an esd less than the $d_{70}$ value. Similarly, the "$d_{10}$" value, is the value determined by the particle esd at which 10% by weight of the particles have an esd less than the $d_{10}$ value, and the "$d_{90}$" value, is the value determined by the particle esd at which 90% by weight of the particles have an esd less than the $d_{90}$ value. Other methods and/or devices for determining particle size and related properties are contemplated.

Particle size distribution (psd) of particulate material can also be characterized by a particle size distribution "steepness." The psd steepness is derived from the slope of a psd curve, where the particle diameter is plotted on the x-axis against a cumulative mass percentage of particles on the y-axis. A wide particle distribution has a relatively lower steepness, whereas a narrow particle size distribution gives rise to a relatively higher steepness. In some aspects, the steepness may be calculated as a ratio of:

$$[\text{steepness}] = \frac{d_{30}}{d_{70}} \times 100$$

or the ratio of the particle size at a cumulative mass of less than 30% of the particles ($d_{30}$), to the particle size at a cumulative mass of less than 70% of the particles ($d_{70}$), as determined by a Sedigraph 5100, multiplied by 100. As the $d_{30}$ and $d_{70}$ values approach each other, the steepness factor increases.

According to some embodiments, the functional particulate may have a particle size distribution steepness ranging from 50 to 96. For example, the functional particulate may have a particle size distribution steepness ranging from 50 to 79, a particle size distribution steepness ranging from 79 to 84, a particle size distribution steepness ranging from 85 to 96, a particle size distribution steepness ranging from 50 to 79, or a particle size distribution steepness ranging from 50 to 84.

According to some embodiments, the functional particulate may have a median particle size ($d_{50}$) ranging from 3.0 microns to 55.0 microns. For example, the functional particulate may have a median particle size ($d_{50}$) ranging from 8.5 microns to 19.8 microns, a median particle size ($d_{50}$) ranging from 6.4 microns to 13.0 microns, a median particle size ($d_{50}$) ranging from 9.3 microns to 15.1 microns, a median particle size ($d_{50}$) ranging from 11.7 microns to 55.0 microns, or a median particle size ($d_{50}$) ranging from 13.0 microns to 27.9 microns.

According to some embodiments, the base material may include a coldset material. For example, the base material may be at least one of plaster, cement, and geopolymer, polymer, or any material having similar characteristics.

According to some embodiments, the composition is a powder. According to some embodiments, the composition may have an angle of repose ranging from 30 degrees to 53 degrees. For example, the powder composition may have an angle of repose ranging from 30 degrees to 44 degrees, from 30 degrees to 48 degrees, from 30 degrees to 38 degrees, from 30 degrees to 60 degrees, from 30 degrees to 34 degrees, or from 30 degrees to 50 degrees.

According to some embodiments, the composition may comprise from 70 wt % to 80 wt % base material, from 15 wt % to 35 wt % functional particulate, and from 5 wt % to 35 wt % binder. For example, the composition may comprise from 70 wt % to 75 wt % base material, from 20 wt % to 25 wt % functional particulate, and from 5 wt % to 15 wt % binder.

According to some embodiments, the composition may be substantially devoid of accelerators. For example, the composition may be completely devoid of accelerators. According to some embodiments, the composition may include accelerators, such as, for example, potassium sulfate.

According to some embodiments, the binder may include at least one of dextrin, poly vinyl alcohol (PVA), cellulose gel, starch, modified starch, and cationic starch.

According to some embodiments, the functional particulate may include at least one of talc, muscovite mica, hydrous kaolin (e.g., high aspect ratio hydrous kaolin), wollastonite, and natural bentonite. According to some embodiments, the functional particulate may include at least one of talc and wollastonite. According to certain embodiments, the functional particulate may be surface-treated. For example, the functional particulate may be surface-treated with functional silianes, such as for example, amino, methacrylate, vinyl, epoxy, mercapto, and blends thereof.

According to some embodiments, the functional particulate may include surface-treated and untreated wollastonite. For example, the wollastonite may be surface-treated with functional silianes, such as for example, amino, methacrylate, vinyl, epoxy, mercapto, and blends thereof.

According to some embodiments, the following surface treatments may be used:

| Chemical Functionality |
| --- |
| Amino- |
| Methacryl- |
| Epoxy- |
| Vinyl- |
| Halo-alkyl- |
| Hydrophobe |
| Lubricant |
| Alkyl- |
| Lubricant modified amino- |
| Urethane Polymer |
| Hydrophobic vinyl- |
| Hydrophobic amino- |
| Hydrophobic, (reduced level)amino- |
| Hydrophobic methacryl- |
| Dual amino- & methacryl- |
| Hydrophobic epoxy- |

In some embodiments, the surface treatment may include the following coupling agents: 1-propanamine, 3-(triethoxysilyl)-, aminosilane surface trimethoxy [3-(oxiranylmethoxy)propyl], epoxysilane 2-propenoic acid, 2-methyl-, 3-(trimethoxysilyl) propyl ester-methacrylsilane, ethenyltriethoxy, vinylsilane (3-chloropropyl) trimethoxy, halo-alkyl-(chloropropyl-), 1,2-ethanediamine, N-[3'-(trimethoxysilyl)propyl], silane, ethoxytrimethyl, 2,5,7,10-tetraoxa-6-silaundecane, and/or 6-ethenyl-6-(2-methoxyethoxy).

In some embodiments, the following agents may be used with the corresponding functionality: glycidyloxypropyltrimethoxysilane (GLYMO)=high compatibility with epoxy; tridecafluorooctyltrimethoxysilane=oleophobicity+hydrophobicity; methyacryloxypropyltrimethoxysilane (MEMO) =scratch resistance; triethoxy-propyl-amino-silane (TE-PAS)+HMDS=high pH silica−9+electrostatic charge; octamethyl-cyclo-tetra-siloxane (D4)=low residual HCl, improved clarity; hexa-decyl-silane (C16)=wets into water; poly-dimethyl-siloxane (PDMS)=high hydrophobicity; hexamethyl-di-silazane (HMDS)=pH neutral; trimethoxy-octylsilane (TMOS)=long chain–high polar stability, no PDMS; dimethyl-dichloro-silane (DDS)=high OH conversion.

In some embodiments, the surface treatment may be a polymer, emulsion, or wax that is deposited or melted onto the surface of the particulate. An example is a PP grafted maleic anhydride or a water based polymer emulsion. These types of surface treatments may not form a chemical bond to the surface of the functional particulate and may not act as a coupling agent from the functional particulate surface into a resin system. This type of surface treatment may typically be used to impart an improved mechanical property in the resin system, such as an impact property.

In some embodiments, the polymer may be a solid elastomer consisting of dimethyl siloxane, dimethylvinyl-terminated and dimethyl, methylhydrogen siloxane. In some embodiments, the polymer may be a PP grafted maleic anhydride. On some embodiments, it may be a maleic anhydride functionalized polypropylene.

In some embodiments, the emulsion may be a water-based emulsion. In some embodiments, the water-based emulsion may be an organomodified polysiloxane, PP polymer, or urethane polymer.

In some embodiments, the chemical treatment may also be an organo-based silane that has the generic structure such as $R-(CH_2)n-Si-X_3$, where R is a non-hydrolyzable organic moiety that can be either an alkyl, aromatic, or organofunctional. According to certain embodiments, these groups provide organic compatibility within a resin system or in the case of reactive organofunctional silanes, to co-react within the polymer.

In some embodiments, the R-group may be an alkyl, aryl, or aromatic to improve gloss, hiding power, mixing time, and other properties related to improved mineral dispersion. Alkyl, aryl, and aromatic silanes may also be utilized to provide hydrophobic surfaces to the particulate surface for moisture sensitive application. The X represents alkoxy moieties, most typically methoxy or ethoxy, which react with the various forms of hydroxyl groups and liberate methanol or ethanol. These groups may provide the linkage with inorganic substrates, pigment, or filler to improve coating integrity and adhesion. In some embodiments, the alkyl group may be polyalkyleneoxidealkoxysilane. In some embodiments, the aromatic group may be a phenyltrimethoxysilane.

In some embodiments, the R-group is an organofunctional group, such as amino, epoxy, or vinyl or some other group that can react into the organic resin (i.e., plastic resin compound), while the X group establishes the chemical covalent bond with the EMVG surface. More complex R-groups may be used which contain more than one of the same type of organofunctional group for increased reactivity with the organic resin.

In some embodiments, the organofunctional group is amino, such as 3-aminopropyltriethoxysilane. In some embodiments, the organofunctional group is epoxy, such as 3-glycidoxypropyltrimethoxysilane. In some embodiments, the organofunctional group is an organosilane ester, such as vinyltriethoxysilane. In some embodiments, the organofunctional group is a methacryl, such as 3-methacryloxypropyltrimethoxysilane. In some embodiments, the organofunctional group is a halo-alkyl, such as 3-chloropropyltrimethoxysilane. In some embodiments, the organofunctional group is more complex and has more than one functional group in the R-group.

In some embodiments, the multi-functional R-groups may be multiple amine groups, such as 3-(2-aminoethylamino) propyltrimethoxysilane.

In some embodiments, a further variation of the surface treatment may be put onto the functional particulate using a combination of an emulsion, polymer or wax and an organo silane-type chemical. The combination may be applied at the same time. A preferred type would be organo silane and an emulsion in an amount up to 1-2 wt % of each type.

In certain embodiments where the surface treatment is functioning as a wetting/lubricating agent to improve flowability and dispersion, then agents like polyethyleneglycol-functional alkoxysilanes are used, or alternatively, arylalkoxy silanes or vinyltrimethoxysilane, or vinyltriethoxysilane may be added.

In some embodiments, the non-reactive wetting silanated agent may include, but are not limited to, methyl-silanes, linear alkyl-silanes, and aromatic silanes. In some embodiments, non-reactive wetting silanated agents may include ethyltrimethoxysilane and octyltrimethoxysilane. In some embodiments, the non-reactive wetting silanated agents may include phenyltrimethoxysilane.

In some embodiments, surface treatments may include, but are not limited to, ammo functional silanes, vinyl functional silanes, and epoxy functional silanes. In some embodiments, the surface treatments may include vinyltrimethoxysilane, 3-aminopropyltrimethoxysilane, glycidoxypropyltrimethoxysilane, (3-glycidoxypropyl)trimethoxysilane, y-glycidoxypropyldiethoxysilane, y-(3,4-epoxycyclohexyl)ethyltrimethoxysilane, γ-anilinopropyltrimethoxysilane, γ-(2-aminoethyl)aminopropyltrimethoxysilane, and γ-methacryloxypropyltrimethoxysilane. In some embodiments, the reactive coupling agents may include 1-propane-amine,3-(triethoxysilyl).

According to some embodiments, the particulate may be surface treated with a binary mix, such as, for example, including two different silanes at the same time with two (or more) silanes, for example, at ratio of two-to-one.

According to some embodiments, the talc may have a median particle size ($d_{50}$) of less than 30 microns, and the wollastonite may have a median particle size ($d_{50}$) of less than 10 microns. For example, the talc may have a median particle size ($d_{50}$) of less than 30 microns, and the wollastonite may have a median particle size ($d_{50}$) of less than 10 microns, the talc may have a median particle size ($d_{50}$) of less than 25 microns, and the wollastonite may have a median particle size ($d_{50}$) of less than 10 microns, the talc may have a median particle size ($d_{50}$) of less than 20 microns, and the wollastonite may have a median particle size ($d_{50}$) of less than 10 microns, or the talc may have a median particle size ($d_{50}$) of less than 15 microns, and the wollastonite may have a median particle size ($d_{50}$) of less than 10 microns.

According to some embodiments, the talc may have an aspect ratio of at least 12:1, and the wollastonite may have an aspect ratio of at least 55:1. For example, the talc may have an aspect ratio of at least 34:1, and the wollastonite may have an aspect ratio of at least 3:1, the talc may have an aspect ratio of at least 24:1, and the wollastonite may have an aspect ratio of at least 4:1, the talc may have an aspect ratio of at least 12:1, and the wollastonite may have an aspect ratio of at least 55:1, or the talc may have an aspect ratio of at least 18:1, and the wollastonite may have an aspect ratio of at least 3:1.

According to some embodiments, the powder composition may be configured to be bound via addition of a liquid. For example, the liquid may include aqueous thermoplastic emulsion binders, such as, for example, glycols. According to some embodiments, the liquid may include glycols and an accelerator. According to some embodiments, the liquid may include emulsion binders, such as, for example, acrylics, vinyl acrylic, ethylene vinyl acetate (EVA), and styrene acrylic. According to some embodiments, the liquid may include emulsion binders that contain non-volatile solids ranging from, for example, 45% to 55% by weight, and that may have a minimum film formation temperature range from zero to 75 degrees C. According to some embodiments, the liquid may include a coalescent, such as, for example, propylene glycol, ester alcohols, polyethylene glycol, or PVP. According to some embodiments, emulsion binders may improve reinforcement, enhance the breaking strength, and/or improve the hardness of the article produced with the functional particulate as compared to the article manufactured with the composition devoid of the functional particulate.

According to some embodiments, the composition may be configured to be bound via heating. For example, the composition may be configured to be bound via heating via a laser.

According to some embodiments, the article manufactured including the functional particulate may have a flexural modulus at least 50% higher as compared to the flexural modulus of the article manufactured with the composition being devoid of the functional particulate. For example, the article manufactured including the functional particulate may have a flexural modulus at least 100% higher as compared to the flexural modulus of the article manufactured with the composition being devoid of the functional particulate, at least 150% higher as compared to the flexural modulus of the article manufactured with the composition being devoid of the functional particulate, or at least 200% higher as compared to the flexural modulus of the article manufactured with the composition being devoid of the functional particulate.

Without wishing to be bound by theory, it is believed that at least one the strength property of the manufactured article including the functional particulate is surprisingly increased as compared to the strength property of the article manufactured with the composition being devoid of the functional particulate, because when the composition is contacted with a liquid or heated during additive manufacturing, small quantities of the base material (e.g., plaster) crystallize and interlock together, thereby also cementing together the remaining insoluble particles. It is believed that the interlocking crystals are responsible for increasing a strength property of manufactured article.

According to some embodiments, the functional particulate may include a lamellar particulate or particulate having a platy morphology (e.g., lamellar talc or talc having a platy morphology), and the lamellar or platy particulate surprisingly improves the flexural modulus, which, without wishing to be bound by theory, is believed to be a result of improved particle packing of the composition. According to some embodiments, the functional particulate may include an acicular particulate (e.g., acicular wollastonite having a high aspect ratio), which may surprisingly improve the flexural modulus of a manufactured article. According to some embodiments, the functional particulate may include particulates having an acicular morphology (e.g., acicular wollastonite having a high aspect ratio) and particulates having a platy or lamellar morphology (e.g., platy talc). The combination of acicular and platy particulates, according to some embodiments, may exhibit a synergistic effect on increasing a strength property of the manufactured article. For example, a functional particulate including particulates having an acicular morphology and particulates having a platy or lamellar morphology may increase the flexural modulus by a surprisingly high percentage.

According to some embodiments, a powder composition for additive manufacturing of an article may include a base material, a functional particulate having at least one of an acicular morphology and a platy morphology, and binder. The powder composition within the article manufactured including the functional particulate may have improved particle packing as compared to the article manufactured with the powder composition being devoid of the functional particulate.

According to some embodiments of the powder composition, the article manufactured including the functional particulate may have a flexural modulus at least 50% higher as compared to the flexural modulus of the article manufactured with the composition being devoid of the functional particulate. For example, the article manufactured including the functional particulate may have a flexural modulus at least 100% higher as compared to the flexural modulus of the article manufactured with the powder composition being devoid of the functional particulate, at least 150% higher as compared to the flexural modulus of the article manufactured with the powder composition being devoid of the functional particulate, or at least 200% higher as compared to the flexural modulus of the article manufactured with the powder composition being devoid of the functional particulate.

According to some embodiments of the powder composition, the functional particulate may have an aspect ratio of at least 3:1. For example, the functional particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

According to some embodiments of the powder composition, the functional particulate may have a particle size distribution steepness ranging from 50 to 96. For example, the functional particulate may have a particle size distribution steepness ranging from 50 to 79, a particle size distribution steepness ranging from 79 to 84, a particle size distribution steepness ranging from 85 to 96, a particle size distribution steepness ranging from 50 to 79, or a particle size distribution steepness ranging from 50 to 84.

According to some embodiments of the powder composition, the functional particulate may have a median particle size ($d_{50}$) ranging from 3.0 microns to 55.0 microns. For example, the functional particulate may have a median particle size ($d_{50}$) ranging from 8.5 microns to 19.8 microns, a median particle size ($d_{50}$) ranging from 6.4 microns to 13.0 microns, a median particle size ($d_{50}$) ranging from 9.3 microns to 15.1 microns, a median particle size ($d_{50}$) ranging from 11.7 microns to 55.0 microns, or a median particle size ($d_{50}$) ranging from 13.0 microns to 27.9 microns.

According to some embodiments of the powder composition, the base material may include a coldset material. For example, the base material may be at least one of plaster, cement, and geopolymer, polymer, or any material having similar characteristics.

According to certain embodiments the base material may be a polymer selected from polyamides (e.g., nylon-11, nylon-12), polyacetals, polypropylene, polyethylene, ionomers, polycarbonates, polylactic acid (PLA), and polystyrene.

According to some embodiments of the powder composition, the powder composition may have an angle of repose ranging from 30 degrees to 53 degrees. For example, the powder composition may have an angle of repose ranging from 30 degrees to 44 degrees, from 30 degrees to 48 degrees, from 30 degrees to 38 degrees, from 30 degrees to 60 degrees, from 30 degrees to 34 degrees, or from 30 degrees to 50 degrees.

According to some embodiments of the powder composition, the powder composition may comprise from 70 wt % to 80 wt % base material, from 15 wt % to 35 wt % functional particulate, and from 5 wt % to 35 wt % binder. For example, the composition may comprise from 70 wt % to 75 wt % base material, from 20 wt % to 25 wt % functional particulate, and from 5 wt % to 15 wt % binder.

According to some embodiments of the powder composition, the powder composition may be substantially devoid of accelerators. For example, the powder composition may be completely devoid of accelerators. According to some embodiments of the powder composition, the composition may include accelerators, such as, for example, potassium sulfate.

According to some embodiments of the powder composition, the binder may include at least one of dextrin, poly vinyl alcohol (PVA), cellulose gel, starch, modified starch, and cationic starch.

According to some embodiments of the powder composition, the functional particulate may include at least one of talc, muscovite mica, hydrous kaolin (e.g., high aspect ratio hydrous kaolin), wollastonite, and natural bentonite.

According to some embodiments, the functional particulate may include at least one of talc and wollastonite.

According to some embodiments, the functional particulate of the powder composition may include surface-treated and untreated wollastonite. For example, the wollastonite may be surface-treated with functional silianes, such as for example, amino, methacrylate, vinyl, epoxy, mercapto, and blends thereof.

According to some embodiments, the talc may have a median particle size ($d_{50}$) of less than 30 microns, and the wollastonite may have a median particle size ($d_{50}$) of less than 10 microns. For example, the talc may have a median particle size ($d_{50}$) of less than 30 microns, and the wollastonite may have a median particle size ($d_{50}$) of less than 10 microns, the talc may have a median particle size ($d_{50}$) of less than 25 microns, and the wollastonite may have a median particle size ($d_{50}$) of less than 10 microns, the talc may have a median particle size ($d_{50}$) of less than 20 microns, and the wollastonite may have a median particle size ($d_{50}$) of less than 10 microns, or the talc may have a median particle size ($d_{50}$) of less than 15 microns, and the wollastonite may have a median particle size ($d_{50}$) of less than 10 microns.

According to some embodiments of the powder composition, the talc may have an aspect ratio of at least 12:1, and the wollastonite may have an aspect ratio of at least 55:1. For example, the talc may have an aspect ratio of at least 34:1, and the wollastonite may have an aspect ratio of at least 3:1, the talc may have an aspect ratio of at least 24:1, and the wollastonite may have an aspect ratio of at least 4:1, the talc may have an aspect ratio of at least 12:1, and the wollastonite may have an aspect ratio of at least 55:1, or the talc may have an aspect ratio of at least 18:1, and the wollastonite may have an aspect ratio of at least 3:1.

According to some embodiments of the powder composition, the powder composition may be configured to be bound (e.g., hardened) via addition of a liquid. For example, the liquid may include aqueous thermoplastic emulsion binders, such as, for example, glycols. According to some embodiments, the liquid may include glycols and an accelerator. According to some embodiments, the liquid may include emulsion binders, such as, for example, acrylics, vinyl acrylic, ethylene vinyl acetate (EVA), and styrene acrylic. According to some embodiments, the liquid may include emulsion binders that contain non-volatile solids ranging from, for example, 45% to 55% by weight, and that may have a minimum film formation temperature range from zero to 75 degrees C. According to some embodiments, the liquid may include a coalescent, such as, for example, propylene glycol, ester alcohols, polyethylene glycol, or PVP. According to some embodiments, emulsion binders may improve reinforcement, enhance the breaking strength, and/or improve the hardness of the article produced with the functional particulate as compared to the article manufactured with the composition devoid of the functional particulate.

According to some embodiments of the powder composition, the powder composition may be configured to be bound via heating. For example, the powder composition may be configured to be bound via heating via a laser.

According to some embodiments, a method of manufacturing an article via additive manufacturing may include providing a first layer of a powder composition. The powder composition may include a base material, a functional particulate having at least one of an acicular morphology and a platy morphology, and binder. The functional particulate may have an aspect ratio of at least 3:1. The method may also include binding the first layer of powder composition in a predetermined pattern to form a hardened two-dimensional shape including the powder composition. The method may further include successively providing additional layers of the powder composition and binding the respective layers to form the article via layers of the hardened two dimensional shapes including the powder composition.

According to some embodiments of the method of manufacturing an article, the method may be consistent with manufacturing techniques sometimes referred to as "powder bed" fabrication, "binder jetting," and "drop-on-powder." In some such embodiments, a bed of powder may be provided, and predetermined two-dimensional shapes are formed in the powder by binding the powder, for example, by adding a liquid to the powder in the predetermined shape or by heating the powder according to the predetermined shape. After binding a layer of the powder in the predetermined shape, an additional layer of the powder may be provided over the hardened layer, and the process may be repeated until the three-dimensional article is completed. After which, according to some embodiments, the excess or unhardened powder may be removed from the article in a process sometimes referred to as "de-powdering." According to some embodiments, additional finishing processes may be subsequently performed, such as painting or treatment (e.g., heat treatment) to strengthen the article.

Powder bed fabrication, binder jetting, and drop-on-powder embodiments are distinguishable from, for example, a process of additive manufacturing sometimes referred to as "fused filament fabrication" (e.g., FUSED DEPOSITION MODELING®), where a polymer filament (or metal wire) is unwound from a coil to supply material to an extrusion nozzle configured to melt the filament and promote or stop the flow of molten material used for additive manufacturing of the article on a manufacturing surface or printing plate. The combination of nozzle and printing plate are configured to move in horizontal and vertical directions to control deposition of the molten material using a computer-aided manufacturing or computer-aided design (CAD) program. By forming the successive layers according to the computer-aided design of the article according to fused filament fabrication, the object is said to be printed.

According to some embodiments of the method of manufacturing an article via additive manufacturing, binding the layers may include at least one of adding liquid to the powder composition in the predetermined pattern, and heating the powder composition according to the predetermined pattern. According to some embodiments, adding liquid to the powder composition may include adding aqueous thermoplastic emulsion binders to the powder composition. According to some embodiments, heating the powder composition may include heating the powder composition via a laser.

For example, the liquid may include aqueous thermoplastic emulsion binders, such as, for example, glycols. According to some embodiments, the liquid may include glycols and an accelerator. According to some embodiments, the liquid may include emulsion binders, such as, for example, acrylics, vinyl acrylic, ethylene vinyl acetate (EVA), and styrene acrylic. According to some embodiments, the liquid may include emulsion binders that contain non-volatile solids ranging from, for example, 45% to 55% by weight, and that may have a minimum film formation temperature range from zero to 75 degrees C. According to some embodiments, the liquid may include a coalescent, such as, for example, propylene glycol or ester alcohols. According to some embodiments, emulsion binders may improve rein-forcement, enhance the breaking strength, and/or improve the hardness of the article produced with the functional particulate as compared to the article manufactured with the composition devoid of the functional particulate.

According to some embodiments of the method of manufacturing an article via additive manufacturing, the article manufactured including the functional particulate may have a flexural modulus at least 50% higher as compared to the flexural modulus of the article manufactured with the composition being devoid of the functional particulate. For example, the article manufactured including the functional particulate may have a flexural modulus at least 100% higher as compared to the flexural modulus of the article manufactured with the powder composition being devoid of the functional particulate, at least 150% higher as compared to the flexural modulus of the article manufactured with the powder composition being devoid of the functional particulate, or at least 200% higher as compared to the flexural modulus of the article manufactured with the powder composition being devoid of the functional particulate.

According to some embodiments of the method of manufacturing an article via additive manufacturing, the functional particulate may have an aspect ratio of at least 3:1. For example, the functional particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

According to some embodiments of the method of manufacturing an article via additive manufacturing, the functional particulate may have a particle size distribution steepness ranging from 50 to 96. For example, the functional particulate may have a particle size distribution steepness ranging from 50 to 79, a particle size distribution steepness ranging from 79 to 84, a particle size distribution steepness ranging from 85 to 96, a particle size distribution steepness ranging from 50 to 79, or a particle size distribution steepness ranging from 50 to 84.

According to some embodiments of the method of manufacturing an article via additive manufacturing, the functional particulate may have a median particle size ($d_{50}$) ranging from 3.0 microns to 55.0 microns. For example, the functional particulate may have a median particle size ($d_{50}$) ranging from 8.5 microns to 19.8 microns, a median particle size ($d_{50}$) ranging from 6.4 microns to 13.0 microns, a median particle size ($d_{50}$) ranging from 9.3 microns to 15.1 microns, a median particle size ($d_{50}$) ranging from 11.7 microns to 55.0 microns, or a median particle size ($d_{50}$) ranging from 13.0 microns to 27.9 microns.

According to some embodiments of the method of manufacturing an article via additive manufacturing, the base material may include a coldset material. For example, the base material may be at least one of plaster, cement, and geopolymer, or any material having similar characteristics.

According to some embodiments of the method of manufacturing an article via additive manufacturing, the powder composition may have angle of repose ranging from 30 degrees to 53 degrees. For example, the powder composition may have an angle of repose ranging from 30 degrees to 44 degrees, from 30 degrees to 48 degrees, from 30 degrees to 38 degrees, from 30 degrees to 60 degrees, from 30 degrees to 34 degrees, or from 30 degrees to 50 degrees.

According to some embodiments of the method of manufacturing an article via additive manufacturing, the powder composition may comprise from 70 wt % to 80 wt % base material, from 15 wt % to 35 wt % functional particulate, and from 5 wt % to 35 wt % binder. For example, the composition may comprise from 70 wt % to 75 wt % base material, from 20 wt % to 25 wt % functional particulate, and from 5 wt % to 15 wt % binder.

According to some embodiments of the method of manufacturing an article via additive manufacturing, the powder composition may be substantially devoid of accelerators. For example, the powder composition may be completely devoid of accelerators. According to some embodiments of the method of manufacturing an article via additive manufacturing, the composition may include accelerators, such as, for example, potassium sulfate.

According to some embodiments of the method of manufacturing an article via additive manufacturing, the binder may include at least one of dextrin, poly vinyl alcohol (PVA), cellulose gel, starch, modified starch, and cationic starch.

According to some embodiments of the method of manufacturing an article via additive manufacturing, the functional particulate may include at least one of talc, muscovite mica, hydrous kaolin (e.g., high aspect ratio hydrous kaolin), wollastonite, and natural bentonite. According to some embodiments, the functional particulate may include at least one of talc and wollastonite.

According to some embodiments of the method, the functional particulate may include surface-treated and untreated wollastonite. For example, the wollastonite may be surface-treated with functional silianes, such as for example, amino, methacrylate, vinyl, epoxy, mercapto, and blends thereof.

According to some embodiments, the talc may have a median particle size ($d_{50}$) of less than 30 microns, and the wollastonite may have a median particle size ($d_{50}$) of less than 10 microns. For example, the talc may have a median particle size ($d_{50}$) of less than 30 microns, and the wollastonite may have a median particle size ($d_{50}$) of less than 10 microns, the talc may have a median particle size ($d_{50}$) of less than 25 microns, and the wollastonite may have a median particle size ($d_{50}$) of less than 10 microns, the talc may have a median particle size ($d_{50}$) of less than 20 microns, and the wollastonite may have a median particle size ($d_{50}$) of less than 10 microns, or the talc may have a median particle size ($d_{50}$) of less than 15 microns, and the wollastonite may have a median particle size ($d_{50}$) of less than 10 microns.

According to some embodiments of the method of manufacturing an article via additive manufacturing, the talc may have an aspect ratio of at least 12:1, and the wollastonite may have an aspect ratio of at least 55:1. For example, the talc may have an aspect ratio of at least 34:1, and the wollastonite may have an aspect ratio of at least 3:1, the talc may have an aspect ratio of at least 24:1, and the wollastonite may have an aspect ratio of at least 4:1, the talc may have an aspect ratio of at least 12:1, and the wollastonite may have an aspect ratio of at least 55:1, or the talc may have an aspect ratio of at least 18:1, and the wollastonite may have an aspect ratio of at least 3:1.

According to some embodiments, a method of strengthening an additive manufactured article may include providing a powder composition including a base material and binder with a functional particulate having at least one of an acicular morphology and a platy morphology. The method may also include binding the powder composition in a predetermined pattern to form a hardened two-dimensional shape comprising the powder composition. The powder composition within the article manufactured including the functional particulate may have improved particle packing as compared to the article manufactured with the powder composition being devoid of the functional particulate.

According to some embodiments of the method of strengthening, binding the layers may include at least one of adding liquid to the powder composition in the predetermined pattern, and heating the powder composition according to the predetermined pattern. According to some embodiments, adding liquid to the powder composition may include adding aqueous thermoplastic emulsion binders to the powder composition. According to some embodiments, heating the powder composition may include heating the powder composition via a laser.

For example, the liquid may include aqueous thermoplastic emulsion binders, such as, for example, glycols. According to some embodiments, the liquid may include glycols and an accelerator. According to some embodiments, the liquid may include emulsion binders, such as, for example, acrylics, vinyl acrylic, ethylene vinyl acetate (EVA), and styrene acrylic. According to some embodiments, the liquid may include emulsion binders that contain non-volatile solids ranging from, for example, 45% to 55% by weight, and that may have a minimum film formation temperature range from zero to 75 degrees C. According to some embodiments, the liquid may include a coalescent, such as, for example, propylene glycol, ester alcohols, polyethylene glycol, or PVP. According to some embodiments, emulsion binders may improve reinforcement, enhance the breaking strength, and/or improve the hardness of the article produced with the functional particulate as compared to the article manufactured with the composition devoid of the functional particulate.

According to some embodiments of the method of strengthening, the article manufactured including the functional particulate may have a flexural modulus at least 50% higher as compared to the flexural modulus of the article manufactured with the composition being devoid of the functional particulate. For example, the article manufactured including the functional particulate may have a flexural modulus at least 100% higher as compared to the flexural modulus of the article manufactured with the powder composition being devoid of the functional particulate, at least 150% higher as compared to the flexural modulus of the article manufactured with the powder composition being devoid of the functional particulate, or at least 200% higher as compared to the flexural modulus of the article manufactured with the powder composition being devoid of the functional particulate.

According to some embodiments of the method of strengthening, the functional particulate may have an aspect ratio of at least 3:1. For example, the functional particulate may have an aspect ratio of at least 12:1, an aspect ratio of at least 15:1, an aspect ratio of at least 18:1, an aspect ratio of at least 24:1, an aspect ratio of at least 34:1, or an aspect ratio of at least 55:1.

According to some embodiments of the method of strengthening, the functional particulate may have a particle size distribution steepness ranging from 50 to 96. For example, the functional particulate may have a particle size distribution steepness ranging from 50 to 79, a particle size distribution steepness ranging from 79 to 84, a particle size distribution steepness ranging from 85 to 96, a particle size distribution steepness ranging from 50 to 79, or a particle size distribution steepness ranging from 50 to 84.

According to some embodiments of the method of strengthening, the functional particulate may have a median particle size ($d_{50}$) ranging from 3.0 microns to 55.0 microns. For example, the functional particulate may have a median particle size ($d_{50}$) ranging from 8.5 microns to 19.8 microns, a median particle size ($d_{50}$) ranging from 6.4 microns to 13.0 microns, a median particle size ($d_{50}$) ranging from 9.3 microns to 15.1 microns, a median particle size ($d_{50}$) ranging from 11.7 microns to 55.0 microns, or a median particle size ($d_{50}$) ranging from 13.0 microns to 27.9 microns.

According to some embodiments of the method of strengthening, the base material may include a coldset material. For example, the base material may be at least one of plaster, cement, and geopolymer, or any material having similar characteristics.

According to some embodiments of the method of strengthening, the powder composition may have angle of repose ranging from 30 degrees to 53 degrees. For example, the powder composition may have an angle of repose ranging from 30 degrees to 44 degrees, from 30 degrees to 48 degrees, from 30 degrees to 38 degrees, from 30 degrees to 60 degrees, from 30 degrees to 34 degrees, or from 30 degrees to 50 degrees.

According to some embodiments of the method of strengthening, the powder composition may comprise from 70 wt % to 80 wt % base material, from 15 wt % to 35 wt % functional particulate, and from 5 wt % to 35 wt % binder. For example, the composition may comprise from 70 wt % to 75 wt % base material, from 20 wt % to 25 wt % functional particulate, and from 5 wt % to 15 wt % binder.

According to some embodiments of the method of strengthening, the powder composition may be substantially devoid of accelerators. For example, the powder composition may be completely devoid of accelerators. According to some embodiments, the composition may include accelerators, such as, for example, potassium sulfate.

According to some embodiments of the method of strengthening, the binder may include at least one of dextrin, poly vinyl alcohol (PVA), cellulose gel, starch, modified starch, and cationic starch.

According to some embodiments of the method of strengthening, the functional particulate may include at least one of talc, muscovite mica, hydrous kaolin (e.g., high aspect ratio hydrous kaolin), wollastonite, and natural bentonite. According to some embodiments, the functional particulate may include at least one of talc and wollastonite.

According to some embodiments of the method of strengthening, the functional particulate may include surface-treated and untreated wollastonite. For example, the wollastonite may be surface-treated with functional silianes, such as for example, amino, methacrylate, vinyl, epoxy, mercapto, and blends thereof.

According to some embodiments, the talc may have a median particle size ($d_{50}$) of less than 30 microns, and the wollastonite may have a median particle size ($d_{50}$) of less than 10 microns. For example, the talc may have a median particle size ($d_{50}$) of less than 30 microns, and the wollastonite may have a median particle size ($d_{50}$) of less than 10 microns, the talc may have a median particle size ($d_{50}$) of less than 25 microns, and the wollastonite may have a median particle size ($d_{50}$) of less than 10 microns, the talc may have a median particle size ($d_{50}$) of less than 20 microns, and the wollastonite may have a median particle size ($d_{50}$) of less than 10 microns, or the talc may have a median particle size ($d_{50}$) of less than 15 microns, and the wollastonite may have a median particle size ($d_{50}$) of less than 10 microns.

According to some embodiments of the method of strengthening, the talc may have an aspect ratio of at least 12:1, and the wollastonite may have an aspect ratio of at least 55:1. For example, the talc may have an aspect ratio of at least 34:1, and the wollastonite may have an aspect ratio of at least 3:1, the talc may have an aspect ratio of at least 24:1, and the wollastonite may have an aspect ratio of at least 4:1, the talc may have an aspect ratio of at least 12:1, and the wollastonite may have an aspect ratio of at least 55:1, or the talc may have an aspect ratio of at least 18:1, and the wollastonite may have an aspect ratio of at least 3:1.

EXAMPLES

A commercially available gypsum powder mixture sold by U.S. Gypsum Company under the brand name Hydrocal White® was used for additive manufacturing (i.e., binder jetting) experiments. The Hydrocal White® was combined with an exemplary functional particulate including lamellar or platy talc and/or acicular wollastonite at various loading levels as described in Table 1 below to form a homogeneous mixture. An exemplary binder, dextrin, and water soluble polymer were added to sample compositions at a 5% loading level. A commercial liquid sold by Z Corporation for binder jetting was used to manufacture the articles via additive manufacturing according to an exemplary binder jetting process.

To measure the green strength or breaking strength of the manufactured articles, test bars having a rectangular cross-sectional shape, a length of 100 millimeters, a width of 15 mm, and a height of 5 mm, were printed using a Z Corporation binder jetting machine. The manufactured bars were then allowed to cure at 85 degrees Fahrenheit overnight without undergoing any post-treatment with adhesives or crosslinking resin materials.

The flexural modulus of these test bars was tested using an Intron 3367 machine and benchmarked against a control test bar formed from a composition including a commercial gypsum powder mixture sold by Z Corporation for binder jetting machine, but not including a functional particulate. Table 1 below shows the results of the testing.

TABLE 1

| Powder Mixture Composition | Reinforce filler & PSD @ d10/d50/d90 (Laser) | Reinforce filler & PSD @ d10/d50/d90 (Laser) | Reinforce filler & PSD @ d10/d50/d90 (Laser) | Flexural Modulus (MPA) |
|---|---|---|---|---|
| Commercial gypsum powder mixture for 3DP- Benchmark | N/A | N/A | N/A | 655 |
| 75% Hydrocal White + 5% Dextrin | 20% High aspect ratio lamellar talc 4.3/27.5/52.9 | | | 1225 |
| 75% Hydrocal White + 5% Dextrin | 15% High aspect ratio lamellar talc 4.3/27.5/52.9 | 5% High aspect ratio lamellar talc 2.9/11.7/38.5 | | 1480 |
| 75% Hydrocal White + 5% Dextrin | 10% High aspect ratio lamellar talc 4.3/27.5/52.9 | 5% High aspect ratio lamellar talc 2.9/11.7/38.5 | 5% High aspect ratio lamellar talc 2.6/9.3/23.8 | 1625 |
| 75% Hydrocal White + 5% Dextrin | 20% High aspect ratio wollastonite 14/55/52.9 | | | 1125 |
| 75% Hydrocal White + 5% Dextrin | 10% High aspect ratio wollastonite 14/55/200 | 10% High aspect ratio wollastonite 1.0/3.0/7.0 | | 1650 |

TABLE 1-continued

| Powder Mixture Composition | Reinforce filler & PSD @ d10/d50/d90 (Laser) | Reinforce filler & PSD @ d10/d50/d90 (Laser) | Reinforce filler & PSD @ d10/d50/d90 (Laser) | Flexural Modulus (MPA) |
|---|---|---|---|---|
| 75% Hydrocal White + 5% Dextrin | 10% High aspect ratio lamellar talc 4.3/27.5/52.9 | 10% High aspect ratio wollastonite 1.0/3.0/7.0 | | 1885 |

Several conclusions may be drawn from the results shown in Table 1. First, the addition of an exemplary functional particulate including lamellar talc and a high aspect ratio acicular wollastonite surprisingly and significantly improved the flexural modulus of the manufactured articles as compared to the control. Second, the addition of an exemplary functional particulate including a different particle size lamellar talc appears to have improved the particle packing of the composition (i.e., a powder composition) and resulted in a higher flexural modulus as compared to the control. Third, the addition of a functional particulate including a high aspect ratio acicular particulate (i.e., wollastonite) in the composition surprisingly and significantly improved the flexural modulus as compared to the control. Finally, the exemplary functional particulate including a combination of lamellar talc and acicular wollastonite showed a synergistic effect, surprisingly and significantly improving the flexural modulus in some examples by over 150%.

According to further testing, an emulsion binder liquid was formulated using 100% acrylic binder. The objective in using this exemplary liquid is to further improve the green strength of the article, so that post-treatment processing to improve the strength of manufactured articles may be avoided.

To adjust the viscosity of emulsion binder liquid to commercial printing ink sold to print articles manufactured via binder jetting, the acrylic binder solids level was adjusted to a 20 wt % solids level. The Brookfield viscosity of exemplary emulsion binder liquid mentioned in Table 2 below is similar to commercially available printing liquids to print the articles manufactured via binder jetting.

To measure the green strength or breaking strength of the molded bars, the composition of the powder mixtures listed in Table 2 were mixed with 30 PHR emulsion ink in a small container until all of the particles were wetted out, and a uniform paste was formed. The paste was then transferred to a rectangular-shaped silicon rubber mold having a length of 100 mm, a width of 15 mm, and a height of 5 mm, and the excess amount of paste at the top of the surface was leveled with a spatula. The materials were allowed cure overnight, the cured bars were remove from the mold, and allowed to cure at 85 degrees F. for an additional eight hours. For comparison, the control mold was prepared using a commercially available jetting mixture and liquid by the same process. As can be seen in Table 2, the flexural modulus data showed surprising and significant improvement compared to the control mold.

Other embodiments will be apparent to those skilled in the art from consideration of the specification and practice of the embodiments disclosed herein. It is intended that the specification and examples be considered as exemplary only.

What is claimed is:

1. A composition for additive manufacturing of an article, the composition comprising:
   a base material;
   a functional particulate comprising talc and wollastonite, wherein the talc has a platy morphology and the wollastonite has an acicular morphology; and
   binder,
   wherein the functional particulate increases a strength property of the article manufactured with the composition as compared to the strength property of the article manufactured with the composition being devoid of the

TABLE 2

| Powder Mixture Composition | Emulsion Ink Compostion | Flexural Modulus (MPA) |
|---|---|---|
| Commercial gypsum powder mixture for 3DP- Control | Commercial liquid ink - Control | 875 |
| 75% Hydrocal White + 5% Dextrin + 20% High aspect ratio lamellar talc (4.3/27.5/52.9) | 95% diluted Rhoplex CL 106 to 20% solids + 5% Propylene Glycol | 1575 |
| 75% Hydrocal White + 5% Dextrin + 15% High aspect ratio lamellar talc (4.3/27.5/52.9) + 5% High aspect ratio lamellar talc (2.9/11.7/38.5) | 95% diluted Rhoplex CL 106 to 20% solids + 5% Propylene Glycol | 1815 |
| 75% Hydrocal White + 5% Dextrin + 10% High aspect ratio lamellar talc (4.3/27.5/52.9) + 5% High aspect ratio lamellar talc (2.9/11.7/38.5) + 5% High aspect ratio lamellar talc (2.6/9.3/23.8) | 95% diluted Rhoplex CL 106 to 20% solids + 5% Propylene Glycol | 1945 |
| 75% Hydrocal White + 5% Dextrin + 20% High aspect ratio wollastonite (14/55/200) | 95% diluted Rhoplex CL 106 to 20% solids + 5% Propylene Glycol | 1430 |
| 75% Hydrocal White + 5% Dextrin + 10% High aspect ratio wollastonite (14/55/200) + 10% High aspect ratio wollastonite (1.0/3.0/7.0) | 95% diluted Rhoplex CL 106 to 20% solids + 5% Propylene Glycol | 1980 |
| 75% Hydrocal White + 5% Dextrin + 10% High aspect ratio lamellar talc (4.3/27.5/52.9) + 10% High aspect ratio wollastonite (1.0/3.0/7.0) | 95% diluted Rhoplex CL 106 to 20% solids + 5% Propylene Glycol | 2050 | functional particulate, and wherein the talc has an aspect ratio of at least 12:1 and the wollastonite has an aspect ratio of at least 3:1.

2. The composition of claim 1, wherein the base material comprises a coldset material.

3. The composition of claim 1, wherein the functional particulate has a particle size distribution steepness ranging from 50 to 96.

4. The composition of claim 1, wherein the composition is a powder.

5. The composition of claim 1, wherein the functional particulate has a median particle size ($d_{50}$) ranging from 3 microns to 55 microns.

6. The composition of claim 1, wherein the composition has an angle of repose ranging from 30 degrees to 53 degrees.

7. The composition of claim 1, wherein the composition has an angle of repose ranging from 30 degrees to 44 degrees.

8. The composition of claim 1, wherein the composition comprises from 70 wt % to 80 wt % base material, from 15 wt % to 25 wt % functional particulate, and from 5 wt % to 15 wt % binder.

9. The composition of claim 1, wherein the composition is devoid of accelerators.

10. The composition of claim 1, wherein the base material comprises at least one of plaster, cement, and geopolymer.

11. The composition of claim 1, wherein the binder comprises at least one of dextrin, poly vinyl alcohol (PVA), cellulose gel, starch, modified starch, and cationic starch.

12. The composition of claim 1, wherein the talc has a median particle size ($d_{50}$) of less than 30 microns, and the wollastonite has a median particle size ($d_{50}$) of less than 10 microns.

13. The composition of claim 1, wherein the composition is configured to be bound via addition of a liquid.

14. The composition of claim 13, wherein the liquid comprises aqueous thermoplastic emulsion binders.

15. The composition of claim 1, wherein the composition is configured to be bound via heating.

16. The composition of claim 1, wherein the article manufactured including the functional particulate has a flexural modulus at least 50% higher as compared to the flexural modulus of the article manufactured with the composition being devoid of the functional particulate.

17. The composition of claim 1, wherein the article manufactured including the functional particulate has a flexural modulus at least 100% higher as compared to the flexural modulus of the article manufactured with the composition being devoid of the functional particulate.

18. The composition of claim 1, wherein the article manufactured including the functional particulate has a flexural modulus at least 150% higher as compared to the flexural modulus of the article manufactured with the composition being devoid of the functional particulate.

* * * * *